No. 779,487. PATENTED JAN. 10, 1905.
C. F. MITCHELL.
HAY LOADER.
APPLICATION FILED JAN. 12, 1904.
2 SHEETS—SHEET 1.
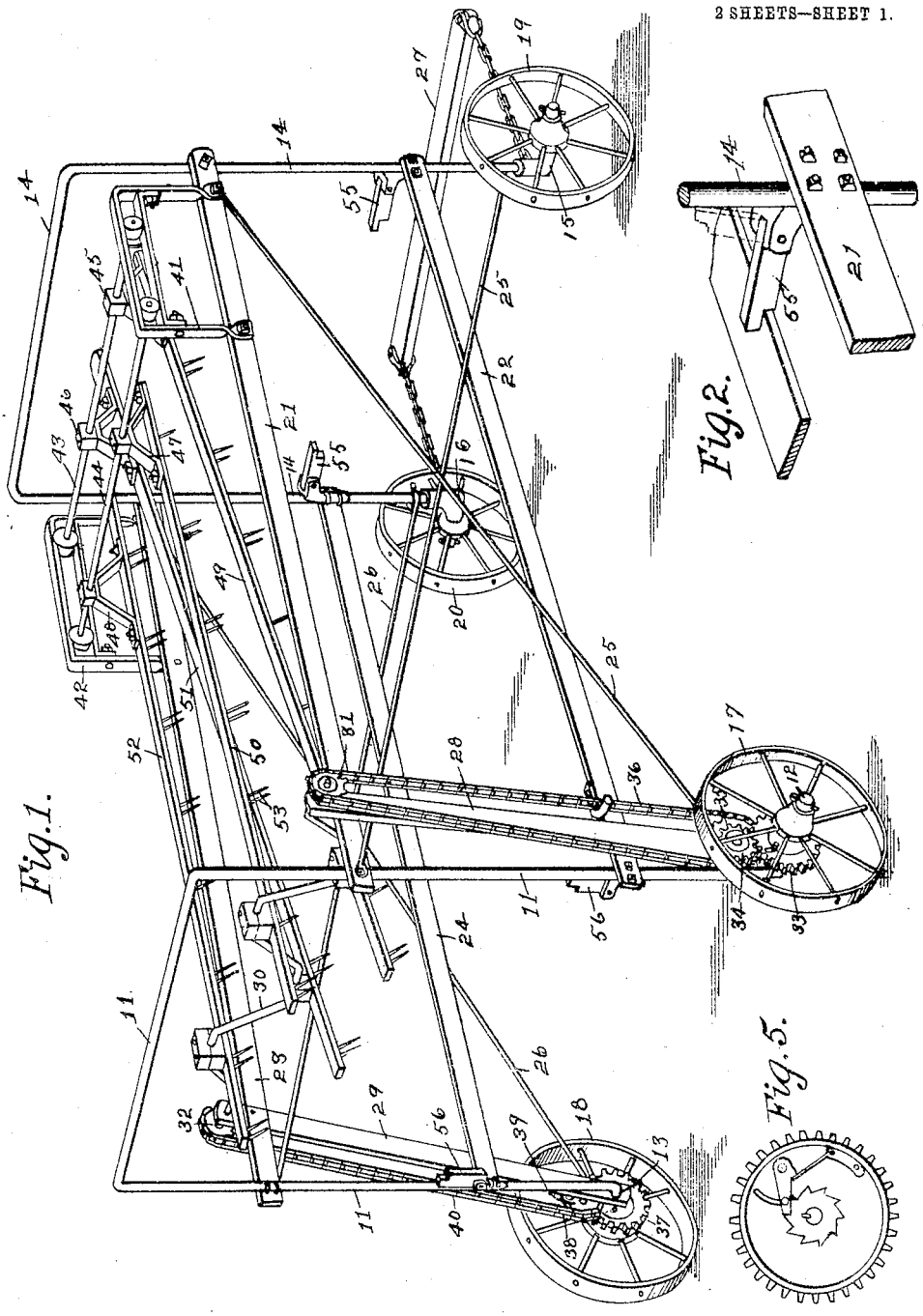
Witnesses
A. G. Hague
J. B. Smutney
Inventor C. F. Mitchell
By Quvig & Lane attys

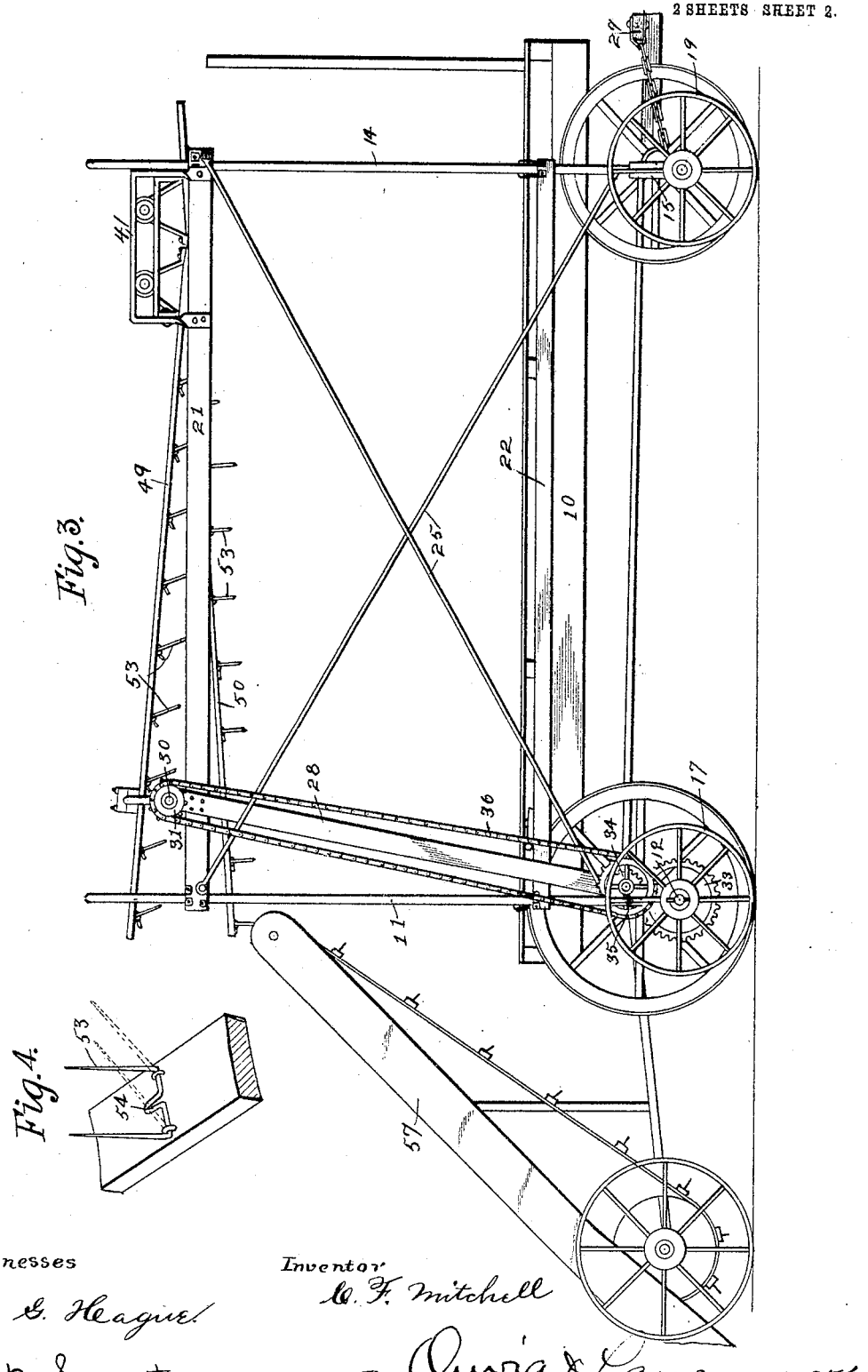

No. 779,487.                                              Patented January 10, 1905.

UNITED STATES PATENT OFFICE.

CHARLES F. MITCHELL, OF SHENANDOAH, IOWA.

HAY-LOADER.

SPECIFICATION forming part of Letters Patent No. 779,487, dated January 10, 1905.

Application filed January 12, 1904. Serial No. 188,812.

*To all whom it may concern:*

Be it known that I, CHARLES F. MITCHELL, a citizen of the United States, residing at Shenandoah, in the county of Page and State of Iowa, have invented certain new and useful Improvements in Hay-Loaders, of which the following is a specification.

The objects of my invention are to provide a device which is designed to be connected with any of the ordinary hay-wagons and is so constructed that it will take the hay after it has been drawn onto the rack by the ordinary loader, which is drawn at the rear of the wagon to be loaded, and spread this hay so that it will be loaded evenly upon the rack and without the assistance of an operator, and, further, to provide a device of this class which is of simple, durable, and inexpensive construction and so arranged that it can be easily drawn to a position outside of the wagon upon which the hay is to be mounted and easily attached to and detached from this wagon.

A further object is to provide means whereby my machine will be firmly held in position relative to the wagon and will be prevented from sidewise movement relative thereto.

A further object is to provide a loader which will not easily become entangled in the hay when it is being operated.

My invention consists in certain details in the construction, arrangement, and combination of the various parts of the device whereby the objects contemplated are attained, as hereinafter more fully set forth, pointed out in my claims, and illustrated in the accompanying drawings, in which—

Figure 1 shows in perspective my complete loader. Fig. 2 is a detail view showing one of the devices for maintaining my loader in position relative to the rack and preventing it from lateral movement relative thereto. Fig. 3 is a side elevation of the loader attached to the ordinary wagon-rack and one of the ordinary hay-loaders, which is attached at the rear of the wagon for drawing the hay onto the rack; and Fig. 4 is a detail view of a portion of one of the bars to which the advancing teeth are pivotally attached, as clearly shown in this figure. Fig. 5 is a detail view showing the mechanism for throwing the device into and out of operation.

Referring to the accompanying drawings, I have used the reference-numeral 10 to indicate the ordinary wagon upon which the hay-rack is mounted, and outside of it my loader is designed to be mounted.

The reference-numeral 11 indicates a U-shaped portion which forms the rear end of the frame and which has the axles 12 and 13 at its lower extremity and extending at right angles to the sides of this U-shaped portion. There is a corresponding U-shaped portion 14 at the forward end of my device having the axles 15 and 16 extending at right angles to the sides of the U-shaped portion 14. On the axle 12 a wheel 17 is mounted, on the axle 13 the wheel 18 is mounted, on the axle 15 the wheel 19 is mounted, and on the axle 16 the wheel 20 is mounted. Connecting the sides of the U-shaped portions are the bars 21 and 22 on one side of the frame and the bars 23 and 24 on the opposite side of the frame. The braces 25 extend diagonally across the same side of the frame as the bars 21 and 22, and the braces 26 extend diagonally across the same side of the frame as the bars 23 and 24. These bars and braces are designed to hold the U-shaped portions 11 and 14 in position relative to each other and make a rigid frame which is mounted upon the wheels above referred to.

Attached to the forward end of the frame is a longitudinal evener 27, which is designed to be pivotally attached to the tongue of the wagon outside of which my loader is designed to be mounted. Connecting the axle 12 and attached to the bars 21 and 22 is the crank-support 28. Attached to the axle 13 and the bars 23 and 24 is the crank-support 29, both of said crank-supports extending a slight distance above the bars 21 and 23, respectively. Extending across the frame and rotatably mounted in the upper portion of the crank-supports 28 and 29 is the crank-shaft 30, having the sprocket-wheel 31 mounted at one end and the sprocket-wheel 32 mounted at the other end of it.

Attached to the inner side of the hub of the wheel 12 is a gear-wheel 33. Mounted on the outside of the crank-support 28 and in mesh with the gear-wheel 33 is a second gear-wheel 34, having the sprocket-wheel 35 firmly attached to it. Passing around the sprocket-wheels 31 and 35 is a sprocket-chain 36, so arranged that as the wheel 17 is advanced over the ground-surface the sprocket-wheels will be rotated and the crank-shaft will be driven. Mounted on the hub of the wheel 18 is a gear-wheel 37. Mounted on the crank-support 29 and in mesh with the gear-wheel 37 is a gear-wheel 38, which has firmly attached to it the sprocket-wheel 39. Passed over the sprocket-wheels 32 and 39 is a sprocket-chain 40, so arranged that as the wheel 18 is advanced over the ground-surface the sprocket-wheels will be rotated and the crank-shaft 30 will be rotated, so that by my arrangement of gearings the crank-shaft 30 will be driven from both ends and will constantly be kept in rotation while my loader is being advanced over the ground-surface.

Attached to the bar 21 and extending upwardly therefrom is a U-shaped support 41. Extending upwardly and attached to the bar 23 is the U-shaped support 42. Extending across the frame of the loader and rotatably and slidingly mounted in the supports 41 and 42 are the shafts 43 and 44. Rotatably mounted on the shaft 43 are the bar-supports 45 and 46. Rotatably mounted on the shaft 44 are the bar-supports 47 and 48. Attached to the bar-support 45 and extending rearwardly therefrom and rotatably mounted at its rear end to the crank 30 is the tooth-supporting bar 49. Attached to the bar-support 47 and rotatably attached at its rear end to the crank 30 is the tooth-supporting bar 50. Attached to the bar-support 46 and rotatably attached at its rear end to the crank 30 is the tooth-supporting bar 51, and attached to the bar-support 48 and rotatably attached at its rear end to the crank 30 is the bar 52. These bars are so arranged and mounted that when the rear ends of two of the bars are at the lower limit of movement the rear end of the other two bars will be at their upper limit of movement, so that as the crank 30 is rotated an oscillating movement of these bars is created. Pivotally attached to each of the bars 49, 50, 51, and 52 are the teeth or tines 53, which are limited in their rearward movement by the projection 54, which is designed to engage the bars to which these teeth are attached when they have reached their rearward limit of movement. This construction and arrangement of teeth is desirable, owing to the fact that the hay which is engaged by the teeth as they are operated will be thrown forwardly and yet the teeth will swing to their forward upper limit of movement as the bars move rearwardly, and thus the teeth will be prevented from engaging the hay on the stroke of the crank which causes them to be drawn rearwardly.

Pivotally attached to each of the side portions of the U-shaped forward end 14 is the locking device 55, each of which extends inwardly toward each other and having a portion of the inner ends cut away and said inner ends being designed to rest against the rack of the wagon. When it is desired to remove the rack from the wagon, the locking devices 55 are swung upwardly on their pivots and out of engagement with the rack. Pivotally attached to the U-shaped rear end 11 of the rack are the locking devices 56, corresponding to the locking devices 55 on the U-shaped forward end 14 and designed to be used for the same purpose in maintaining the loader in position relative to the rack of the wagon.

In practical operation the device is drawn into the position shown in Fig. 3 of the drawings outside of the wagon 10. The hay-loader 57 is attached in the ordinary way to the rear end of this wagon 10, and as the wagon is advanced the mechanism of my loader will be set into operation in the manner above described. As the loader 57 throws the hay onto the rack a pile will accumulate at the rear end of the rack, which is mounted on the wagon 10, and when this pile accumulates so that it reaches a sufficient height so that the hay will be engaged by the teeth 52 the hay will be thrown forwardly by these teeth, which are constantly operated as the wagon and my loader are advanced over the ground-surface. As the loader at the rear of the wagon keeps increasing the size of the pile on the rear of the wagon my loader throws the hay forwardly, and thus causes an even spread of the hay over the entire wagon-frame, and this obviates the necessity of having a man to load the hay.

Having thus described my invention, what I claim, and desire to secure by Letters Patent of the United States therefor, is—

1. In a device of the class described, the combination of a frame, U-shaped end portions in the frame, wheels rotatably connected with said U-shaped end portions, sides for connecting the end portions with each other, bars extending longitudinally of the frame and near its top portion, means for oscillating said bars, and means for holding the frame in position outside of a wagon as the wagon is drawn over the ground-surface.

2. In a device of the class described, a frame, U-shaped end portions in the frame, having wheels rotatably mounted on each side of each of the U-shaped end portions, hay-advancing bars mounted at the upper portion of the frame and extending longitudinally of it, locking devices attached to each side of the U-shaped end portions for maintaining the frame in position relative to the rack of a wagon and preventing it from sidewise movement as the wagon and frame are drawn forwardly together, means connected with the traction-wheels for oscillating the bars as the frame is advanced over the ground-surface.

3. In a device of the class described, the combination of a frame having U-shaped end portions, wheels rotatably connected with said U-shaped end portions, sides for connecting the end portions with each other, hay-advancing bars extending longitudinally of the frame and near its top portion, and means for operating said bars.

4. In a device of the class described, the combination of a frame having U-shaped end portions, wheels rotatably connected with said U-shaped end portions, sides for connecting the end portions with each other, hay-advancing bars extending longitudinally of the frame and near its top portion, and means operatively connected with the rear wheels for operating said bars.

5. In a device of the class described, the combination of a frame having U-shaped end portions, wheels connected with said U-shaped end portions, sides for connecting the end portions with each other, a crank-shaft extending across said frame, bars extending longitudinally of the frame and attached to said crank-shaft, and means for operating said crank-shaft.

6. In a device of the class described, the combination of a frame having U-shaped end portions, wheels connected with said U-shaped end portions, sides for connecting the end portions with each other, a crank-shaft extending across said frame, bars extending longitudinally of the frame and attached to said crank-shaft, and means connected with the wheels at the rear of the frame and each end of the crank-shaft to operate the bars.

C. F. MITCHELL.

Witnesses:
W. H. HUGHES,
R. P. GALT.